US011913632B2

(12) United States Patent
Lin et al.

(10) Patent No.: US 11,913,632 B2
(45) Date of Patent: Feb. 27, 2024

(54) POWER TOOL

(71) Applicant: Basso Industry Corp., Taichung (TW)

(72) Inventors: Ta-Jay Lin, Taichung (TW); San-Yih Su, Taichung (TW)

(73) Assignee: Basso Industry Corp., Taichung (TW)

(*) Notice: Subject to any disclaimer, the term of this patent is extended or adjusted under 35 U.S.C. 154(b) by 0 days.

(21) Appl. No.: 18/163,289

(22) Filed: Feb. 2, 2023

(65) Prior Publication Data

US 2023/0265999 A1 Aug. 24, 2023

(30) Foreign Application Priority Data

Feb. 22, 2022 (TW) ................................ 111201829

(51) Int. Cl.
*F21V 33/00* (2006.01)
*B24B 23/02* (2006.01)
*B25F 5/02* (2006.01)

(52) U.S. Cl.
CPC .......... *F21V 33/0084* (2013.01); *B24B 23/02* (2013.01); *B25F 5/02* (2013.01)

(58) Field of Classification Search
CPC ............ B24B 23/20; B25B 23/18; B25F 5/02
See application file for complete search history.

(56) References Cited

U.S. PATENT DOCUMENTS 5,461,790 A * 10/1995 Olstowski ............. B23Q 17/24 30/390
6,575,590 B1 * 6/2003 Wadsworth ............. B25F 5/021 362/120
6,890,135 B2 * 5/2005 Kopras ................... B25F 5/008 362/120
7,185,998 B2 * 3/2007 Oomori ................... B25F 5/021 408/16
8,360,597 B1 * 1/2013 Hanchett ................. F21V 17/02 362/190
11,027,392 B1 * 6/2021 McCurry ............... B23D 45/16
2002/0054491 A1 * 5/2002 Casas ...................... B25F 5/021 362/119
2003/0047050 A1 * 3/2003 Onose .................. B23D 59/003 30/376

(Continued)

FOREIGN PATENT DOCUMENTS

JP 2013059820 A 4/2013
JP 2019098466 A 6/2019
JP 2021074875 A 5/2021

*Primary Examiner* — Eyamindae C Jallow
(74) *Attorney, Agent, or Firm* — CKC & Partners Co., LLC

(57) ABSTRACT

A power tool includes a motor, an output shaft, a tool main body and an adjustable lighting mechanism. The output shaft is connected to the motor. The tool main body includes an end face and a curved guiding slot. The curved guiding slot is near the end face. The adjustable lighting mechanism includes a housing, a swinging member and a lighting source. The housing is moveably mounted to the tool main body and guided by the curved guiding slots. The swinging member is connected to the housing and includes a pivot centerline. The lighting source is disposed at the housing and includes a lighting centerline. The housing can rotate outward from an output axis, such that the pivot centerline moves within a swinging range and the lighting centerline moves within a lighting range.

10 Claims, 6 Drawing Sheets

(56) References Cited

U.S. PATENT DOCUMENTS

| | | | | |
|---|---|---|---|---|
| 2003/0058638 A1* | 3/2003 | Gillette | B25B 23/18 | 362/202 |
| 2004/0049927 A1* | 3/2004 | Wu | B23D 59/003 | 30/389 |
| 2005/0111214 A1* | 5/2005 | Zeiler | B25B 23/18 | 362/119 |
| 2009/0077817 A1* | 3/2009 | Gibbons | B23D 59/003 | 33/286 |
| 2017/0167721 A1* | 6/2017 | Padget | F21V 23/04 | |

* cited by examiner

POWER TOOL

RELATED APPLICATIONS

This application claims priority to Taiwan Application Serial Number 111201829, filed Feb. 22, 2022, which is herein incorporated by reference.

BACKGROUND

Technical Field

The present disclosure relates to a processing tool. More particularly, the present disclosure relates to a power tool for processing.

Description of Related Art

Power tools have characteristics of portability and ease of processing, and thus are widely used. Power tools such as grinding tools are applicable in small areas or dark corner areas for construction purposes, thus lighting is extremely important. However, the configurations of lighting mechanisms on current power tools are stationary, and the position or angle of lighting cannot be adjusted; hence, when accessories of various diameters are replaced on the power tool, the lighting source is often masked, causing major inconvenience in use.

To solve this problem, Japanese Patent No. 2021074875A discloses a belt sander which includes a lighting mechanism with adjustable angles; however, the lighting mechanism rotates with the grip portion, and the direction of lighting is predetermined to be parallel with the grip portion, which needs to be improved on. Therefore, how to structurally improve the adjustability of lighting position or angle becomes a target that the practitioners pursued.

SUMMARY

According to one aspect of the present disclosure, a power tool is provided. The power tool includes a motor, an output shaft, a tool main body, and an adjustable lighting mechanism. The motor includes an output axis, the output shaft is connected to the motor along the output axis, and the tool main body is configured to receive the motor and includes an end face and one or more curved guiding slots. The end face includes a tool hole for the output shaft to go therethrough to connect to the motor, and the one or more curved guiding slots are near the end face. The adjustable lighting mechanism includes a housing, one or more swinging members and a lighting source, the housing is moveably mounted to the tool main body and guided by the one or more curved guiding slots, the one or more swinging members are connected to the housing and include a pivot centerline, and the lighting source is disposed at the housing and includes a lighting centerline. The housing rotates toward a direction away from the output axis relative to the tool main body, such that the pivot centerline moves within a swinging range and the lighting centerline moves within a lighting range, the swinging range of the one or more swinging members is between negative thirty degrees and zero degree relative to a line parallel to the output axis, and the lighting range is between zero degree and thirty degrees relative to another line parallel to the output axis.

According to another aspect of the present disclosure, a power tool is provided. The power tool includes a motor, an output shaft, a tool main body, and an adjustable lighting mechanism. The motor includes an output axis, the output shaft is connected to the motor along the output axis, and the tool main body includes an outer surface, an end face, a mounting slot and one or more curved guiding slots. The outer surface surrounds and forms a container space for receiving the motor, the end face is connected to the outer surface and includes a tool hole for the output shaft to go therethrough to connect to the motor, the mounting slot is recessed from the outer surface, and the one or more curved guiding slots are located at the mounting slot. The adjustable lighting mechanism includes a housing, one or more swinging members and a lighting source, the housing is moveably mounted to the tool main body and guided by the one or more curved guiding slots, the one or more swinging members are connected to the housing and include a pivot centerline, and the lighting source is disposed at the housing and includes a lighting centerline. The housing rotates toward a direction away from the output axis relative to the tool main body, such that the pivot centerline moves within a swinging range and the lighting centerline moves within a lighting range, the swinging range of the one or more swinging members is between negative thirty degrees and zero degree relative to a line parallel to the output axis, and the lighting range is between zero degree and thirty degrees relative to another line parallel to the output axis.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
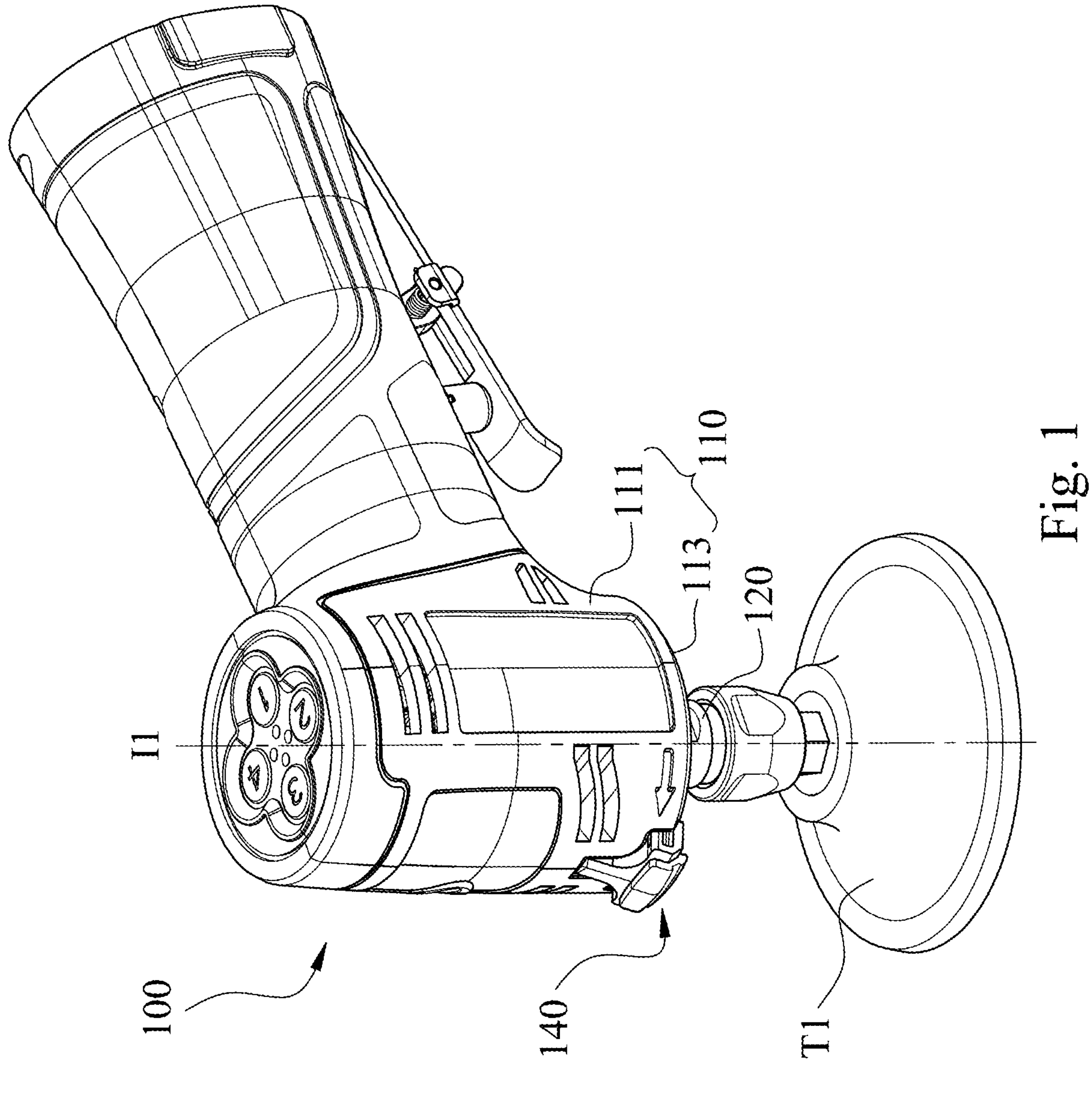
FIG. 1 shows a three-dimensional schematic view of a power tool according to the first embodiment of the present disclosure with a grinding disk.
Figure 2:
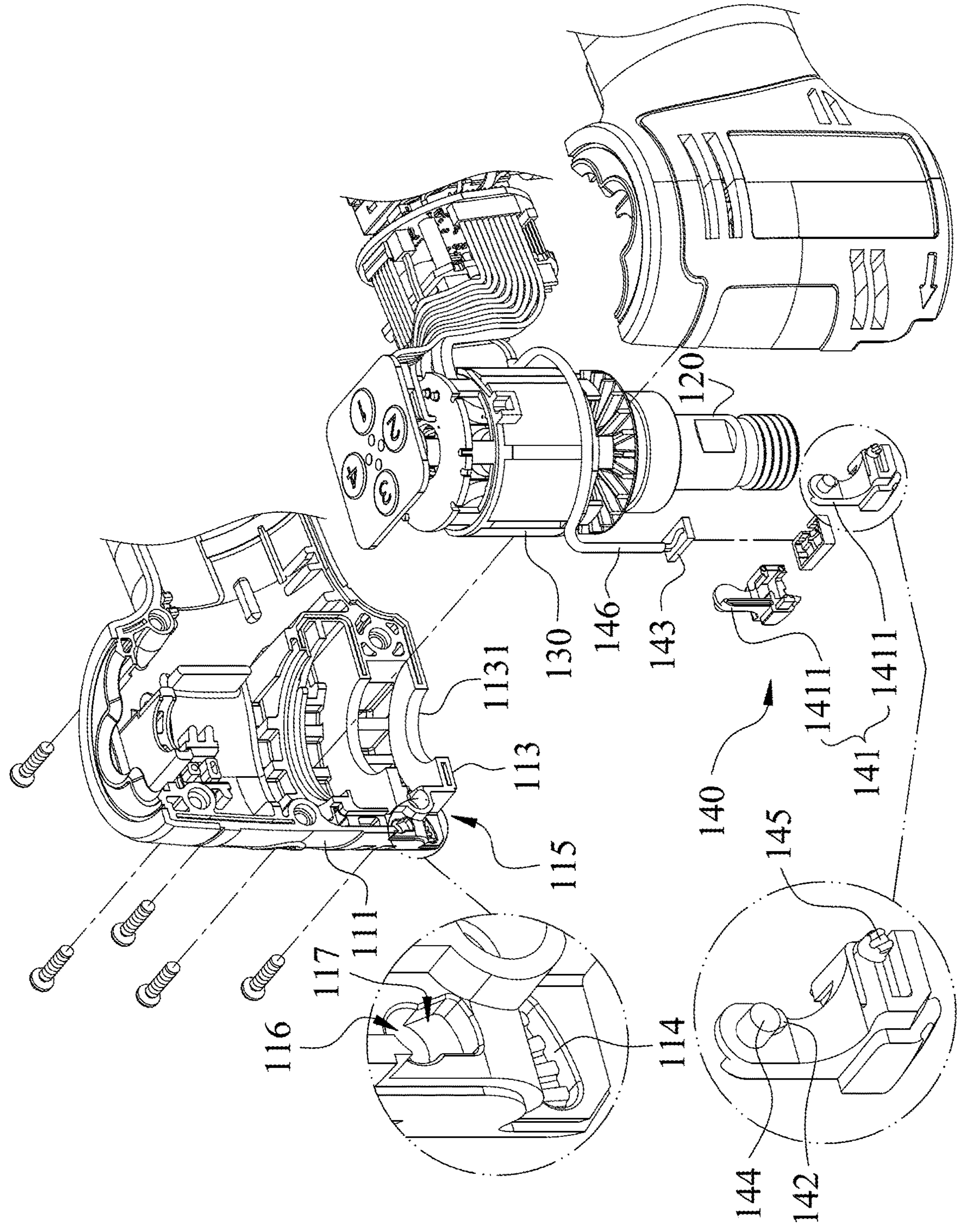
FIG. 2 shows an exploded schematic view of the power tool of the first embodiment of FIG. 1.

FIG. 1 shows a three-dimensional schematic view of a power tool 100 according to the first embodiment of the present disclosure with a grinding disk T1. FIG. 2 shows an exploded schematic view of the power tool 100 of the first embodiment of FIG. 1. As shown in FIG. 1 and FIG. 2, the power tool 100 includes a motor 130, an output shaft 120, a tool main body 110 and an adjustable lighting mechanism 140. The motor 130 includes an output axis I1, the output shaft 120 is connected to the motor 130 along the output axis I1, and the tool main body 110 is configured to receive the motor 130 and includes an end face 113 and one or more curved guiding slots 114. The end face 113 includes a tool hole 1131 for the output shaft 120 to go therethrough to connect to the motor 130, the one or more curved guiding slots 114 are near the end face 113.

Figure 3:
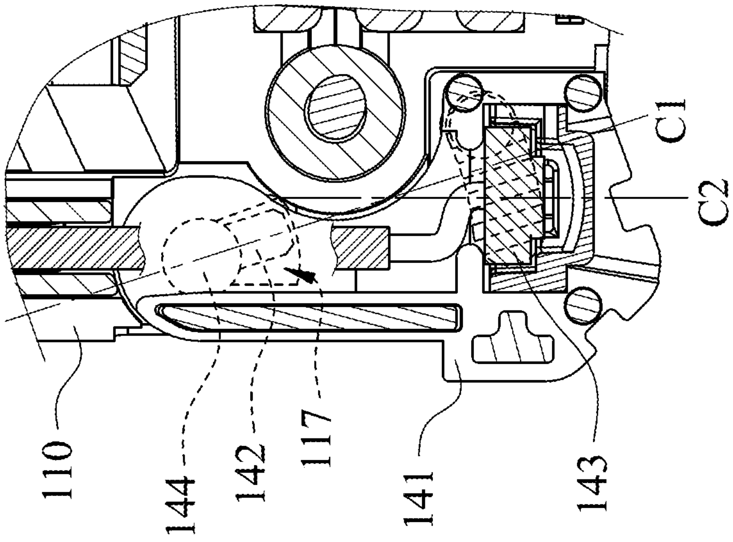
FIG. 3 shows one partial cross-sectional schematic view of the power tool of the first embodiment of FIG. 1.

The adjustable lighting mechanism 140 can include a housing 141, one or more swinging members 142 and a lighting source 143, the housing 141 is moveably mounted to the tool main body 110 and guided by the one or more curved guiding slots 114, the one or more swinging members 142 are connected to the housing 141 and include a pivot centerline C1 (as shown in FIG. 3), and the lighting source 143 is disposed at the housing 141 and includes a lighting centerline C2. The housing 141 rotates toward a direction away from the output axis I1 relative to the tool main body 110, such that the pivot centerline C1 moves within a swinging range and the lighting centerline C2 moves within a lighting range, the swinging range of the one or more swinging members 142 is between negative thirty degrees and zero degree relative to a line parallel to the output axis I1, and the lighting range is between zero degree and thirty degrees relative to another line parallel to the output axis I1.

Figure 9:
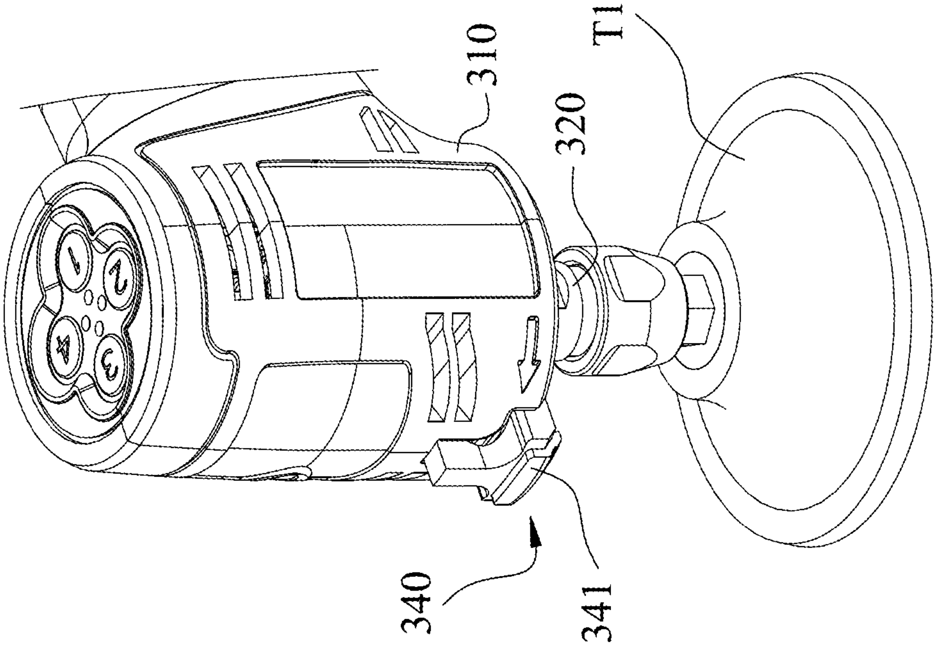
FIG. 9 shows another three-dimensional schematic view of the power tool of the third embodiment of FIG. 8 with a grinding disk.

Therefore, with the curved guiding slots 114 being near the end face 113 and the adjustable lighting mechanism 140 being near the end face 113, the lighting source 143 can emit light from the front of the end face 113. Additionally, through the configuration that the swinging range of the one or more swinging members 142 is between negative thirty degrees and zero degree relative to the line parallel to the output axis I1, when the housing 141 is at a first position, a condition where the housing 141 protrudes from the tool main body 110 is prevented, allowing the lighting source 143 to be positioned at zero degree; and when the housing 141 is at a second position, the lighting centerline C2 moves to thirty degrees, allowing the user to adjust the lighting angle or direction according to situational requirements when different grinding accessories are operated (such as the grinding disk T1 as shown in FIG. 1 or the smaller grinding head T2 as shown in FIG. 9), which improves ease of use. The details of power tool 100 will be described hereinafter.

The tool main body 110 can further include an outer surface 111 surrounding and defining a container space for receiving the motor 130, the end face 113 is connected to the outer surface 111, and the end face 113 can include screw threads exposed at one end of the tool hole 1131 to correspond to a screw nut and the grinding disk T1. It is especially noted that for the clarity of the drawings, in some drawings both the screw nut and the grinding disk T1 are shown, in some drawings only the screw nut is shown, in some drawings neither the screw nut nor the grinding disk T1 is shown, and the present disclosure is not limited by the drawings.

The tool main body 110 can further include a mounting slot 115 recessed from the outer surface 111. Specifically, the tool main body 110 can include two semi casings, each with a recess such that the assembled surface is defined as the outer surface 111 and the end face 113, and the two recesses can communicate with each other to form the mounting slot 115.

Figure 4:
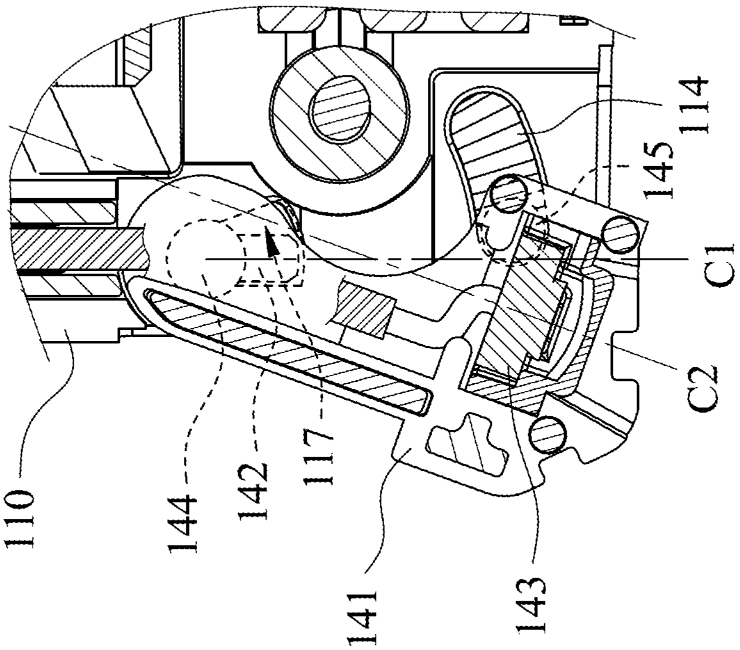
FIG. 4 shows another partial cross-sectional schematic view of the power tool of the first embodiment of FIG. 1.

FIG. 3 shows one partial cross-sectional schematic view of the power tool 100 of the first embodiment of FIG. 1. FIG. 4 shows another partial cross-sectional schematic view of the power tool 100 of the first embodiment of FIG. 1. As shown in FIG. 3 and FIG. 4 as well as FIG. 2, the adjustable lighting mechanism 140 can include one or more pivot members 144 attached to the housing 141 and integrally connected to the tool main body 110, and the one or more pivot members 144 are integrally connected to the one or more swinging members 142.

In detail, the housing 141 pivots to the tool main body 110 via the one or more pivot members 144, and the housing 141 can include two semi housings 1411 assembled to form a holding space for the lighting source 143. A number of the aforementioned pivot members 144 is two, a number of the one or more swinging members 142 is two, each of the two pivot members 144 and each of the two swinging members 142 can be respectively located at each of two sides of the housing 141, that is to say each of the two pivot members 144 and each of the two swinging members 142 can protrude from each of the semi housings 1411, and each of the pivot members 144 can be integrally connected to each of the swinging members 142.

The housing 141 can pivot to the mounting slot 115, because the tool main body 110 can further include two pivot holes 116 and two positioning slots 117, the two pivot holes 116 are respectively located at two side surfaces of the mounting slot 115 and are communicated with the mounting slot 115, and each of the positioning slots 117 is located at each of the side surfaces and is communicated to each of the pivot holes 116. In other words, each of the pivot holes 116 and each of the positioning slots 117 are located within each of the recesses of each of the semi casings, enabling easier assemblage.

As the adjustable lighting mechanism 140 assembles to the tool main body 110, each of the pivot members 144 is received in each of the pivot holes 116, and each of the swinging members 142 is received in and restricted by each of the positioning slots 117, the positioning slots 117 can be substantially fan-shaped, and the circular angle of the fan shape corresponds to the swinging range.

A number for the aforementioned curved guiding slots 114 can be two, each of the curved guiding slots 114 is located at each of the two side surfaces of the mounting slot 115, that is, each of the curved guiding slots 114 is located within each of the recesses of each of the semi casings; and the adjustable lighting mechanism 140 can further include two elastic positioning protrusions 145 attached to the two sides of the housing 141, that is, the two elastic positioning protrusions 145 are protruded from each of the semi housings 1411. Therefore, when the housing 141 pivots to the tool main body 110 at the first position or the second position, each of the elastic positioning protrusions 145 is restricted at different positions in each of the curved guiding slots 114.

The elastic positioning protrusions 145 can be elastic and thus can be abutted against the walls of the curved guiding slots 114, when external forces are applied to the housing 141, the elastic positioning protrusions 145 radially reduce or deform to allow the housing 141 to rotate outward or inward, and when the external forces are removed, the elastic positioning protrusions 145 can be positioned at the walls of the curved guiding slots 114 to restrict the position of the housing 141; the elasticity of the elastic positioning protrusions 145 can be achieved by structural or material configurations, and the present disclosure is not limited thereto. Furthermore, the elastic positioning protrusions 145 can include a plurality of abutting ribs, the curved guiding slots 114 can include a plurality of abutting grooves, and the abutting ribs respectively correspond to the abutting grooves to further strengthen positioning.

Figure 8:
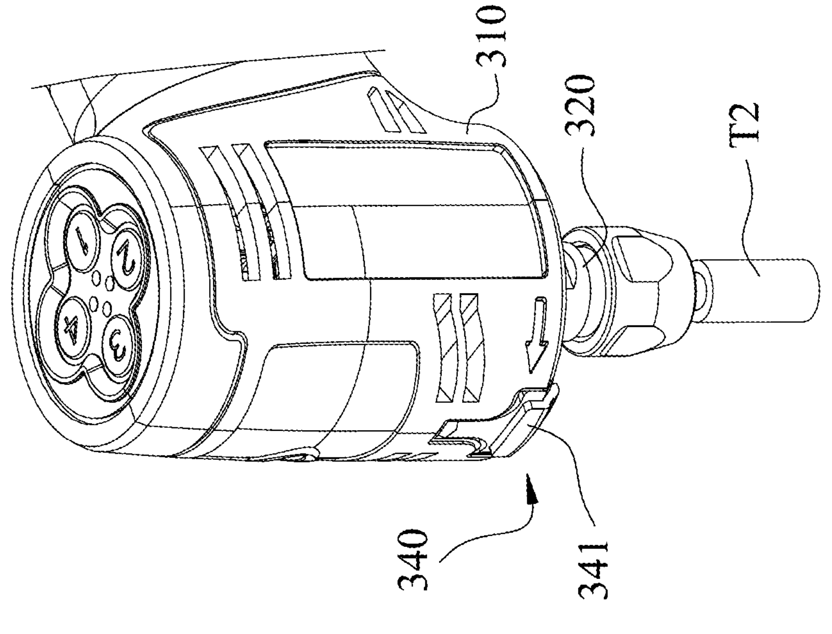
FIG. 8 shows one three-dimensional schematic view of a power tool according to the third embodiment of the present disclosure with a smaller grinding head.

As shown in FIG. 3, at this time the housing 141 is positioned at the first position relative to the tool main body 110, at this time the pivot centerline C1 of the swinging members 142 is negative thirty degrees relative to the line parallel to the output axis I1, and the housing 141 does not protrude from the outer surface 111 (which can be seen in FIG. 5); the lighting centerline C2 is zero degree relative to the aforementioned another line parallel to the output axis I1, thus at this time the lighting centerline C2 is parallel to the output axis I1, and can pair with for example the smaller grinding head T2 as shown in FIG. 8.

In addition, as shown in FIG. 4, the user can apply a force to the housing 141 to allow the housing 141 to rotate outward to the second position, at this time the pivot centerline C1 of the swinging members 142 is zero degree relative to the aforementioned line parallel to the output axis I1, that is to say the pivot centerline C1 is parallel to the output axis I1, and the lighting centerline C2 is thirty degrees relative to the aforementioned another line parallel to the output axis I1; thus at this time the lighting centerline C2 is away from the output axis I1, and the power tool 100 can for example be coordinated with the grinding disk T1 as shown in FIG. 1. As a result, the user only needs to operate the housing 141 by hand to adjust the lighting centerline C2, and no other tools are required; the user can intuitively adjust the adjustable lighting mechanism 140 by requirements of grinding accessories, which improves practicality and convenience.

Figure 5:
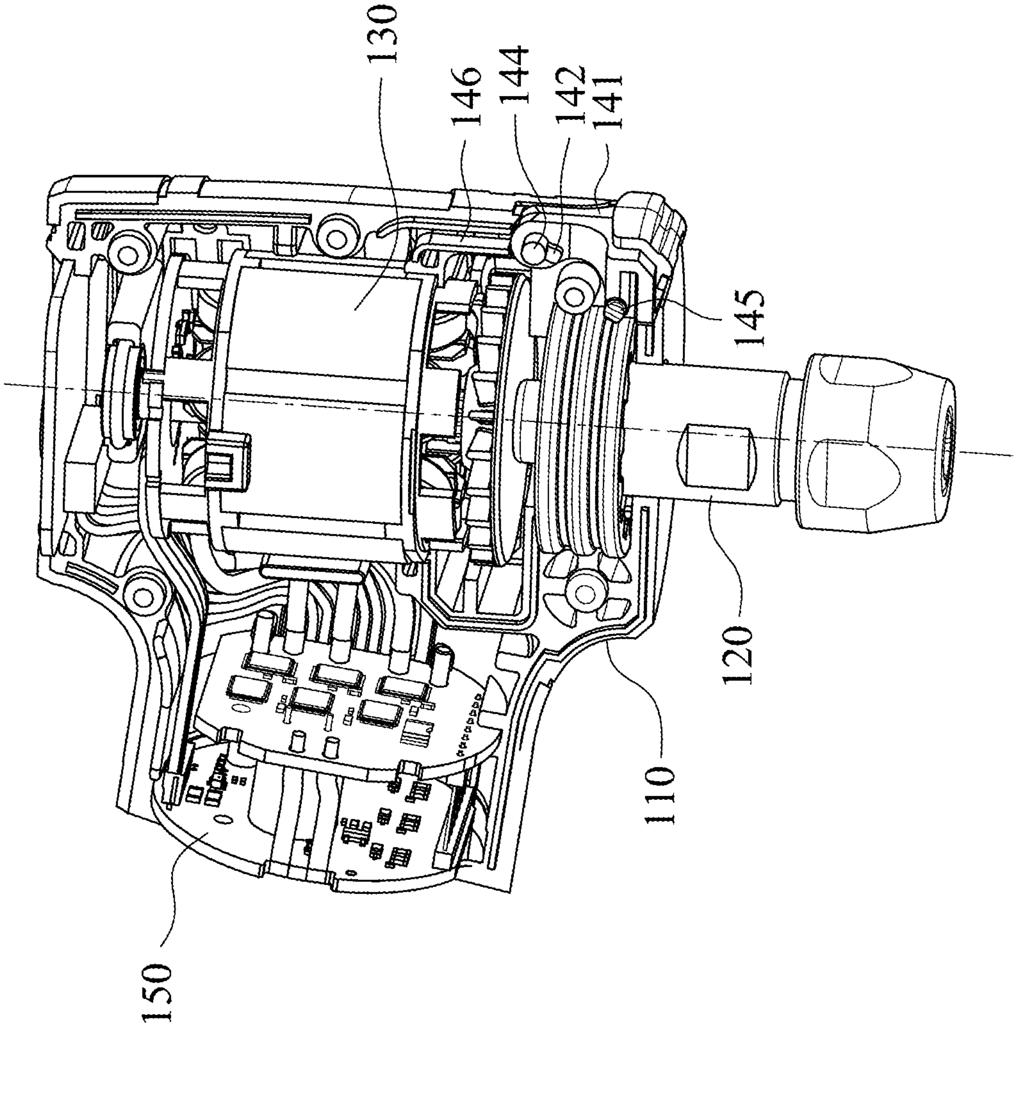
FIG. 5 shows a partial internal three-dimensional schematic view of the power tool of the first embodiment of FIG. 1.

FIG. 5 shows a partial internal three-dimensional schematic view of the power tool 100 of the first embodiment of FIG. 1. As shown in FIG. 5 and FIG. 2, the adjustable lighting mechanism 140 can further include one or more wires 146, the one or more wires 146 can connect to the lighting source 143, surround the periphery of the motor 130, and then connect to a circuit board 150 near the grip portion of the power tool 100, but this does not limit the configuration of the location of the one or more wires 146.

Figure 7:
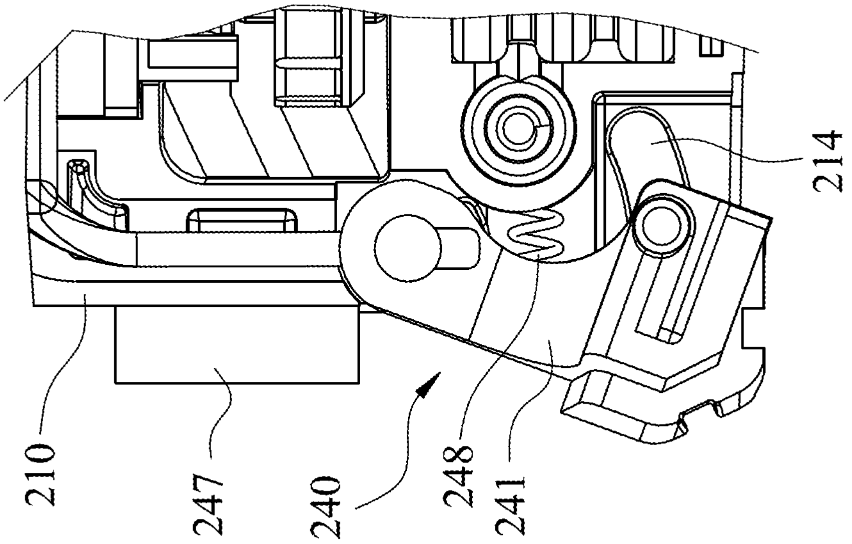
FIG. 7 shows another partial internal side schematic view of the power tool of the second embodiment of FIG. 6.
Figure 6:
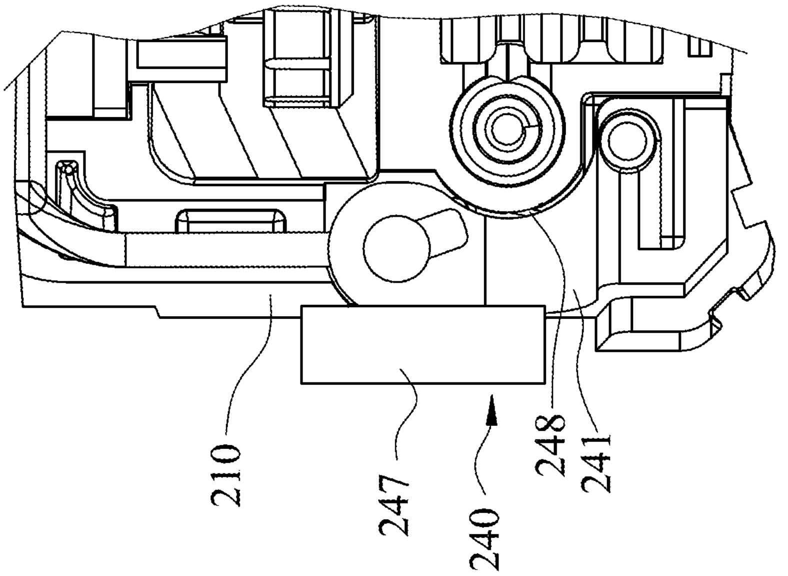
FIG. 6 shows one partial internal side schematic view of a power tool according to the second embodiment of the present disclosure.

FIG. 6 shows one partial internal side schematic view of a power tool according to the second embodiment of the present disclosure. FIG. 7 shows another partial internal side schematic view of the power tool of the second embodiment of FIG. 6. As shown in FIG. 6 and FIG. 7, the power tool of the second embodiment is similar to the power tool 100 of the first embodiment and includes a motor (not shown in the second embodiment), an output shaft (not shown in the second embodiment), a tool main body 210 and the adjustable lighting mechanism 240, the tool main body 210 includes a mounting slot (not shown in the second embodiment) and one or more curved guiding slots 214, the differences will be explained as follows, and the same or similar parts will not be discussed repeatedly.

The adjustable lighting mechanism 240 can further include a slider 247 and a spring 248, the slider 247 is moveably disposed at the tool main body 210, and the spring 248 is abutted between the mounting slot of the tool main body 210 and the housing 241. As show in FIG. 6, when the slider 247 is in a fastening position and restricts the housing 241, the spring 248 is compressed and the housing 241 is in a first position, and when the slider 247 is in a releasing position and does not restrict the housing 241, the spring 248 is restored to push the housing 241 to rotate outward to a second position relative to the tool main body 210.

Specifically, the slider 247 can move along the direction of the output axis (not shown in the second embodiment), the slider 247 in the fastening position can block the housing 241, such that the housing 241 cannot move and thus is restricted in the first position. Conversely, the user can move the slider 247 upward to unblock the housing 241 from the restriction of the slider 247, such that when the spring 248 releases elastic forces to move the housing 241, the housing 241 can rotate outward to the second position. The user only needs to move the slider 247 downward to restore the housing 241 to the first position.

FIG. 8 shows one three-dimensional schematic view of a power tool according to the third embodiment of the present disclosure with a smaller grinding head T2. FIG. 9 shows another three-dimensional schematic view of the power tool of the third embodiment of FIG. 8 with a grinding disk T1. As shown in FIG. 8 and FIG. 9, the power tool of the third embodiment is similar to the power tool 100 of the first embodiment and includes the motor (not shown in the third embodiment), the output shaft 320, the tool main body 310 and the adjustable lighting mechanism 340. However, the housing 341 of the adjustable lighting mechanism 340 does linear motion in a direction orthogonal to the direction of the output axis (not shown in the third embodiment) rather than rotational motion. As such, as shown in FIG. 8, the housing 341 can be located at the first position, and the power tool can for example be coordinated with the smaller grinding head T2. The user can for example move the housing 341 axially to change the housing 341 to the second position as shown in FIG. 9 and the power tool can be coordinated with the grinding disk T1; the distance of the movement can for example be between zero centimeter and twenty five centimeters.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power tool, comprising:
- a motor comprising an output axis;
- an output shaft connected to the motor along the output axis;
- a tool main body configured to receive the motor, comprising:
  - an end face comprising a tool hole for the output shaft to go therethrough to connect to the motor; and
  - one or more curved guiding slots near the end face; and
- an adjustable lighting mechanism, comprising:
  - a housing moveably mounted to the tool main body and guided by the one or more curved guiding slots;
  - one or more swinging members connected to the housing and comprising a pivot centerline; and
  - a lighting source disposed at the housing and comprising a lighting centerline;
- wherein the housing rotates toward a direction which is away from the output axis relative to the tool main body, such that the pivot centerline moves within a swinging range and the lighting centerline moves within a lighting range, the swinging range of the one or more swinging members is between negative thirty degrees and zero degree relative to a line parallel to the output axis, and the lighting range is between zero degree and thirty degrees relative to another line parallel to the output axis.

2. The power tool of claim 1, wherein the adjustable lighting mechanism further comprises one or more pivot members attached to the housing and integrally connected to the tool main body, and the one or more pivot members are integrally connected to the one or more swinging members.

3. The power tool of claim 2, wherein a number of the one or more pivot members is two, a number of the one or more swinging members is two, the two pivot members are attached to two sides of the housing, the tool main body further comprises two pivot holes and two positioning slots, each of the pivot holes is communicated with each of the positioning slots, as the adjustable lighting mechanism pivots to the tool main body, each of the pivot members is received in each of the pivot holes, and each of the swinging members is received in and restricted by each of the positioning slots.

4. The power tool of claim 3, wherein a number of the one or more curved guiding slots is two, and the adjustable lighting mechanism further comprises two elastic positioning protrusions attached to the two sides of the housing, such that when the housing pivots to the tool main body at a first position or a second position, each of the elastic positioning protrusions is restricted at different positions in each of the curved guiding slots.

5. The power tool of claim 2, wherein the adjustable lighting mechanism further comprises a slider and a spring, the slider is moveably disposed at the tool main body, the spring is abutted between a mounting slot of the tool main body and the housing, when the slider is in a fastening position and restricts the housing, the spring is compressed and the housing is in a first position, and when the slider is in a releasing position and does not restrict the housing, the spring is restored to push the housing to rotate outward to a second position relative to the tool main body.

6. A power tool, comprising:

a motor comprising an output axis;

an output shaft connected to the motor along the output axis;

a tool main body, comprising:

an outer surface surrounding and forming a container space for receiving the motor;

an end face connected to the outer surface and comprising a tool hole for the output shaft to go therethrough to connect to the motor;

a mounting slot recessed from the outer surface; and one or more curved guiding slots located at the mounting slot; and an adjustable lighting mechanism, comprising:

a housing moveably mounted to the tool main body and guided by the one or more curved guiding slots;

one or more swinging members connected to the housing and comprising a pivot centerline; and a lighting source disposed at the housing and comprising a lighting centerline;

wherein the housing rotates toward a direction which is away from the output axis relative to the tool main body, such that the pivot centerline moves within a swinging range and the lighting centerline moves within a lighting range, the swinging range of the one or more swinging members is between negative thirty degrees and zero degree relative to a line parallel to the output axis, and the lighting range is between zero degree and thirty degrees relative to another line parallel to the output axis.

7. The power tool of claim 6, wherein the housing comprises two semi housings assembled to form a holding space for the lighting source, a number of the one or more swinging members is two, the adjustable lighting mechanism further comprises two pivot members, each of the two pivot members protrudes from each of the semi housings and integrally connected to each of the swinging members, and the lighting source is secured in the holding space.

8. The power tool of claim 7, wherein the tool main body further comprises two pivot holes and two positioning slots, the pivot holes are respectively located at two side surfaces of the mounting slot and are communicated with each of the pivot members, each of the positioning slots is located at each of the two side surfaces and is communicated to each of the pivot holes, as the adjustable lighting mechanism pivots to the tool main body, each of the pivot members is received in each of the pivot holes, and each of the swinging members is received in and restricted by each of the positioning slots.

9. The power tool of claim 8, wherein a number of the one or more curved guiding slots is two, the adjustable lighting mechanism further comprises two elastic positioning protrusions respectively protrude from the semi housings, when the housing pivots to the tool main body at a first position or a second position, and each of the elastic positioning protrusions are positioned at different positions in each of the curved guiding slots.

10. The power tool of claim 6, wherein the adjustable lighting mechanism further comprises a slider and a spring, the slider is moveably disposed at the tool main body, the spring is abutted between the mounting slot and the housing, when the slider is in a fastening position and restricts the housing, the spring is compressed and the housing is in a first position, and when the slider is in a releasing position and does not restrict the housing, the spring is restored to push the housing to rotate outward to a second position relative to the tool main body.

* * * * *